(12) United States Patent
Hamed et al.

(10) Patent No.: US 10,415,189 B2
(45) Date of Patent: Sep. 17, 2019

(54) POLYALKYLENE GLYCOL BASED REAGENT WITH ALDEHYDE END GROUPS SUITABLE FOR MAKING CELLULOSIC FIBERS WITH MODIFIED MORPHOLOGY

(71) Applicant: Rayonier Performance Fibers, LLC, Jacksonville, FL (US)

(72) Inventors: Othman A. Hamed, Savannah, GA (US); Romuald S. Krzywanski, Richmond Hills, GA (US)

(73) Assignee: RAYONIER PERFORMANCE FIBERS, LLC, Jacksonville, FL (US)

( * ) Notice: Subject to any disclaimer, the term of this patent is extended or adjusted under 35 U.S.C. 154(b) by 0 days.

(21) Appl. No.: 16/110,390

(22) Filed: Aug. 23, 2018

(65) Prior Publication Data

US 2019/0100879 A1   Apr. 4, 2019

Related U.S. Application Data

(60) Provisional application No. 62/567,297, filed on Oct. 3, 2017.

(51) Int. Cl.
| | |
|---|---|
| *D21H 17/53* | (2006.01) |
| *C08G 65/331* | (2006.01) |
| *D21H 11/20* | (2006.01) |
| *D21C 9/00* | (2006.01) |
| *D21H 11/18* | (2006.01) |
| *D21H 17/06* | (2006.01) |

(52) U.S. Cl.
CPC .......... *D21H 11/20* (2013.01); *C08G 65/331* (2013.01); *D21C 9/005* (2013.01); *D21H 11/18* (2013.01); *D21H 17/06* (2013.01); *D21H 17/53* (2013.01)

(58) Field of Classification Search
CPC ....................................................... D21H 11/20
USPC .................................................. 528/245, 230
See application file for complete search history.

(56) References Cited

U.S. PATENT DOCUMENTS

| | | |
|---|---|---|
| 2,977,331 A | 3/1961 | Ericks et al. |
| 3,224,926 A | 12/1965 | Bernardin |
| 3,241,553 A | 3/1966 | Steiger |
| 3,700,549 A | 10/1972 | Liss-Albin Croon et al. |
| 3,844,880 A | 10/1974 | Meisel, Jr. et al. |

(Continued)

FOREIGN PATENT DOCUMENTS

| | | |
|---|---|---|
| EP | 0 427 316 | 5/1991 |
| WO | 2005/108669 | 11/2005 |

OTHER PUBLICATIONS

Srinivasan et al; Manufacture of long chain polyol polymers having aldehyde end groups; 2004; Council of Scientific and Industrial Research, India; Chem Abstract 141:124154 (1 of 1 CAPLUS in 16110390 STN-CPC) (Year: 2004).*

(Continued)

*Primary Examiner* — Duc Truong
(74) *Attorney, Agent, or Firm* — Wenderoth, Lind & Ponack, L.L.P.

(57) ABSTRACT

The present invention is directed to a novel polyalkylene glycol based reagent with aldehyde end groups, wherein the preparation of the reagent includes the steps of provide a polyalkylene glycol; provide an aldehyde compound; mix both reagents polyalkylene glycol and aldehyde in 1:2 equivalent; stir the mixture for a certain period of time until a clear solution is obtained, and dilute with water to a desirable concentration.

30 Claims, 2 Drawing Sheets

(56) References Cited

U.S. PATENT DOCUMENTS

| | | | |
|---|---|---|---|
| 3,929,678 | A | 12/1975 | Laughlin et al. |
| 4,204,054 | A | 5/1980 | Lesas et al. |
| 4,412,989 | A | 11/1983 | Iwashita et al. |
| 5,281,207 | A | 1/1994 | Chmielewski et al. |
| 6,068,620 | A | 5/2000 | Chmielewski |
| 6,969,443 | B1 | 11/2005 | Kokko |
| 7,074,301 | B2 | 7/2006 | Hamed et al. |
| 7,288,167 | B2 | 10/2007 | Sears et al. |
| 8,138,106 | B2 | 3/2012 | Hamed et al. |
| 2003/0195485 | A1 | 10/2003 | Rangachari et al. |
| 2005/0079361 | A1 | 4/2005 | Hamed et al. |
| 2007/0077428 | A1 | 4/2007 | Hamed et al. |
| 2008/0276378 | A1* | 11/2008 | Fennen .................. C14C 3/22 |
| 2010/0125155 | A1 | 5/2010 | Arthur |
| 2018/0223479 | A1 | 8/2018 | Hamed et al. |

OTHER PUBLICATIONS

International Search Report and Written Opinion issued in International Application No. PCT/US2018/054090 dated Dec. 11, 2018.
Poly(propylene glycol) (600) diglycidyl ether Tech Data—Polyscience—retrieve on Dec. 27, 2018.
International Search Report dated May 23, 2018 in International Application No. PCT/US18/16958.
Written Opinion of the International Searching Authority dated May 23, 2018 in International Application No. PCT/US18/16958.

* cited by examiner

POLYALKYLENE GLYCOL BASED REAGENT WITH ALDEHYDE END GROUPS SUITABLE FOR MAKING CELLULOSIC FIBERS WITH MODIFIED MORPHOLOGY

FIELD OF THE INVENTION

The present invention relates to cellulose fibers combined with a polymeric based material able to modify the fiber properties by bonding simultaneously to multiple cellulosic chains. Thus, producing wood pulp with modified morphology suitable for use as a transfer, or surge, layer in an absorbent article intended for body waste management. The polymeric based material is made from two reagents—polymeric and monomeric. Embodiments of the present invention relate to a process of making the polymeric based reagent and using it for making a transfer fiber. Another embodiment of the present invention relates to a process of using the transfer fibers as a transfer layer in an absorbent article.

DESCRIPTION OF RELATED ART

Absorbent articles intended for body fluid management typically are comprised of a top sheet, a back sheet, an absorbent core located between the top sheet and back sheet, and an optional transfer or surge layer located below the top sheet and over the absorbent core. The transfer layer is mainly comprised of cross-linked cellulosic fibers. A transfer layer composed of cross-linked fibers usually provides better transfer and distribution of liquid, increases rate of liquid absorption, reduces gel blocking, and improves surface dryness.

Transfer layers are usually made of cross-linked cellulose fibers of wood pulp. Cross-linked cellulosic fibers and processes for making them have been known for many years, and are described in detail in the literature (see, for example G. C. Tesoro, Cross-Linking of Cellulosics, in *Handbook of Fiber Science and Technology*, Vol. II, M. Lewis and S. B. Sello eds. pp 1-46, Mercell Decker, New York (1993)). They are typically prepared by reacting cellulose with reagents capable of bridging the hydroxyl groups of the adjacent cellulose chains.

Cross-linked fibers are usually made by two different methods know in the art as dry and wet crosslinking.

The characteristics of wet-cross-linked fiber in a dry state are essentially similar to those of untreated fiber. Wet cross-linking of pulp is believed to improve the physical properties of pulp in many ways, such as improving fiber wet resiliency and enhancing moisture regain. The main disadvantages of the wet cross-linked pulp are that it has higher retention under load when compared to dry cross-linked fibers and low bulk.

Dry cross-linking of fibers usually improves the physical properties of fibers in many ways, such as improving the resiliency (in the dry and wet state), reducing the absorbency under load, and increasing absorbency. For this reason dry cross-linked fiber is preferred over the wet cross-linked fiber for use as a transfer layer in absorbent articles. However, dry cross-linked cellulosic fibers have not been widely adopted in absorbent products, seemingly because of the difficulty of making cross-linked cellulosic fibers without causing severe damage to the fiber and discoloration. Since, heating the treated fibers in presence of cross-linking agent is likely to cause interlocking between fibers that would make it difficult to fiberize them into individual fibers. Potential damage to the fibers is most likely to occur during the defibration stage due to interlocking of the fibers. This would make the crosslinked fibers not useful for use in an absorbent product.

For this reason, most of the crosslinked fibers reported in the literature are made in fluff form. In this case the treated wet pulp is dried at low temperature, then thoroughly fluffed as individual fibers prior to curing, otherwise dried fibers come out as fiber bundles, or entanglements (knots and nits). Once fibers are entangled during flash drying, the fibers are very difficult to be disentangled into individual fibers for subsequent uses.

Methods of making cross-linked fiber are described in several patents like U.S. Pat. Nos. 4,204,054; 3,844,880; 3,700,549; 3,241,553; 3,224,926; 7,074,301; and 7,288,167; European Patent No. 0,427,361 B1; and European Patent No. 1745175A4, the disclosures of which are incorporated by reference herein in their entirety.

In addition, dry crosslinking is usually carried out a temperature of over 160° C. Exposing pulp to such high temperature causes the fiber to suffer from more drawbacks, such as yellowing. Another major issue is that the dry cross-linking is carried at low pH using an acidic crosslinking agent with pH of about 3.0. So, produced fibers have highly acidic properties (very low pH), due to residual unreacted carboxyl groups present on crosslinking agent. Fiber with very low pH may cause skin irritation when used in absorbent article intended for body waste management.

It is therefore, an object of the present invention to provide a modified polymer based crosslinking agent for making fiber with modified morphology and process of making the fiber at milder temperature and near neutral pH. The fiber is suitable for use as a liquid transfer in absorbent articles intended for body waste management.

Another object of the present invention is to make such transfer pulp free from the before-mentioned disadvantages such as yellowing, low pH and high content of knots, nits and fines.

SUMMARY OF THE INVENTION

In view of the difficulties present in making liquid transfer pulp, there is a need for a simple, relatively inexpensive reagent(s) that reacts with cellulosic chains at a moderate temperature and neutral pH or close to neutral to produce liquid transfer with attractive specifications such as low contents of knots and nits, low discoloration, and can be defiberized without a serious damage to the fibers.

It is therefore a feature of an embodiment of the invention to provide a polymeric based crosslinking reagent able to react with cellulose chains and produce pulp with modified properties suitable for use as liquid transfer fiber in an absorbent article intended for body waste management. It also is a feature of an embodiment of the present invention to provide a method of making the cellulosic based transfer fiber in a sheet form using the polymeric based crosslinking reagent of the present invention. Wherein, upon defiberization produces fluff with high brightness, reduced contents of knots, nits, and fine. It is yet another feature of an embodiment of the present invention to provide a method of making the cellulosic based transfer fibers in the fluff form using the crosslinking reagent of the present invention. It is yet another embodiment of the present invention to make a transfer layer from the transfer fiber of the present invention that improves retention, absorption capacity, absorption rate, absorbency under load and rewet of an absorbent article. In another feature of feature of an embodiment of the present invention, the transfer fiber contains an odor absorbing material that is chemically bond to it.

In yet another feature of an embodiment of the present invention, the transfer fibers may be utilized as a transfer layer or in the absorbent core of an absorbent article.

In accordance with these and other features of embodiments of the invention, there is provided a polymeric based crosslinking reagent useful for making cellulosic based transfer pulp. The polymeric based crosslinking reagent is composed of a polymeric chain and an end group. The polymeric chain is a polyalkylene glycol, and the end groups are substituents able to form covalent bonds with the hydroxyl groups of the cellulose chain at relatively low to moderate temperature.

In accordance with an additional feature of an embodiment of the present invention, the method provided of making cellulosic based transfer pulp that includes applying a solution of the polymeric based crosslinking reagent of the present invention to cellulosic fibers in sheet form to impregnate the fibers, then drying the impregnated cellulosic fibers. Another suitable method further provides impregnating cellulosic fibers in slurry form with a solution of the polymeric based crosslinking reagent and drying the fibers.

These and other objects, features and advantages of the present invention will appear more fully from the following detailed description of the preferred embodiments of the invention.

DETAILED DESCRIPTION OF THE INVENTION

Figure 1A:
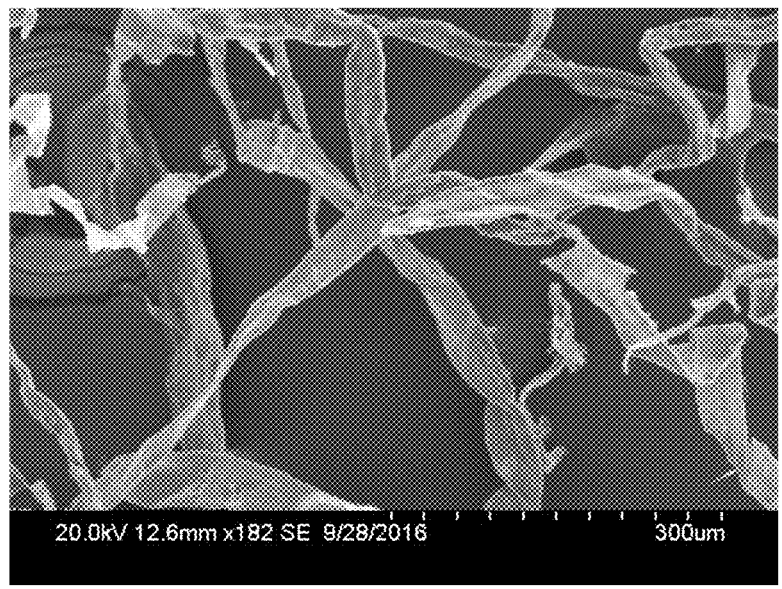
FIG. 1(A) is a SEM image at ×200 and FIG. 1(B) is a SEM image at ×50 of transfer fibers prepared as shown in Examples 3 and 6 (samples 9 and 17), respectively.

The present invention is directed to a polyalkylene glycol based reagent with aldehyde end groups. The polyalkylene glycol based reagent with aldehyde end groups will be referred to though the entire manuscript as polyalkylene glycol based crosslinking reagent. The polyalkylene glycol based crosslinking agent of the present invention composed of a polymeric moiety and an end group.

The polymeric moiety is a polyalkylene glycol and the end group is an aldehyde.

The polyalkylene glycol based crosslinking reagent is preferably made from reacting polyalkylene glycol compound with a dialdehyde compound. The polyalkylene glycol based crosslinking reagent is especially useful for making a liquid transfer pulp with high brightness, improved bulkiness, and low liquid retention under load. The liquid transfer pulp of the present invention is especially useful for use in an absorbent article structure. Embodiments of the present invention may be used with any classes of absorbent structures, without limitation, whether disposable or otherwise. Without being limited to a specific theory, the polyalkylene glycol chain appears to act as a plasticizer and a hydrogen bonding disrupter. As such, the polyalkylene glycols disrupt the hydrogen bonding sites by occupying the space between the cellulosic chains, thereby reducing interfiber bonding, thus enhancing the fluffing properties of the transfer fiber and reducing knots and knits after defiberization. The aldehyde end groups serve to bridge the adjacent cellulosic chains through bonding to their hydroxyl groups, thereby increasing the resiliency and porosity of the fibers.

Another embodiment of the present invention concerns cellulosic based transfer pulp made from reacting the polyalkylene glycol based crosslinking reagent with cellulosic fibers. Produced cellulosic based pulp of the present invention is useful in absorbent articles, and especially in forming transfer (surge) layer or an absorbent core in an absorbent article. The precise construction of the absorbent article is not critical to the present invention, and any absorbent article can benefit from this invention. Suitable absorbent garments are described, for example, in U.S. Pat. Nos. 5,281,207, and 6,068,620, the disclosures of each of which are incorporated by reference herein in their entirety including their respective drawings. Those skilled in the art will can utilize the transfer fibers of the present invention in an absorbent garment, core, acquisition layer, and the like, using the guidelines provided herein.

Any dialdehyde compound capable of reacting with polyalkylene glycol compound to produce a polymeric based crosslinking reagent able to react simultaneously with the hydroxyl groups of the cellulosic chains may be used in the present invention. Examples of suitable dialdehyde are aliphatic dialdehyde, urea based dialdehyde and combinations thereof.

Examples of preferred aliphatic dialdehyde are: glyoxal, glutaraldehyde, 1,4-cyclohexane dicaroxaldehyde, 1,3-cyclohexane dicaroxaldehyde, glyceraldehydes and the mixtures and combinations thereof.

Examples of preferred urea based dialdehyde are methylolated urea, methylolated cyclic urea, methylolated lower alkyl cyclic urea, methylolated dihydroxy cyclic urea, dihydroxy cyclic urea, and lower alkyl substituted cyclic urea. Especially preferred urea based dialdehyde are dimethyldihydroxy urea (DMDHU, or 1,3-dimethyl-4,5-dihydroxy-2-imidazolidinone), dimethyloldihydroxyethylene urea (DMDHEU, or 1,3-dihydroxymethyl-4,5-di hydroxy-2-imidazolidinone), dimethylol urea (DMU, or bis[N-hydroxymethyl]urea), dihydroxyethylene urea (DHEU, or 4,5-dihydroxy-2-imidazolidinone), dimethylolethylene urea (DMEU, or 1,3-dihydroxymethyl-2-imidazolidinone), and dimethyldihydroxyethylene urea (DDI, or 4,5-dihydroxy-1,3-dimethyl-2-imidazolidinone). Other suitable substituted urea include glyoxal adducts of urea.

Preferred dialdehydes are glyoxal, glutaraldehyde and 1,4-cyclohexane dicarboxaldehyde.

Polyalkylene glycol compound that may be used in embodiments of the present invention those that are water soluble or form water soluble products when reacted with dialdehyde or urea based aldehyde.

The polyalkylene glycol suitable for use in the present invention preferably has the molecular formula R'O—(R—O)$_n$R' where n could be anywhere from 6 to 2000, R could be ethyl, isopropyl or butyl and R' is H or a glycidyl group Typical examples of such polyalkylene glycol include but are not limited to: polyethylene glycol, polypropylene glycol, polytetrahydrofuran, polyethylene glycol diglycidyl ether, polypropyleneglycol diglycidyl ether, polytetrahydrofuran diglycidyl ether or any combination thereof.

Schemes 1 and 2 show the reactions for making the polyethylene glycol based crosslinking agent from reacting a polyethylenylene glycol and a polyethylenylene glycol diglycidyl ether with glyoxal, respectively.

Scheme 1: A representative chemical structure of the polyethlene glycol based cross-linking agent produced from reacting polyethylene glycol with glyoxal

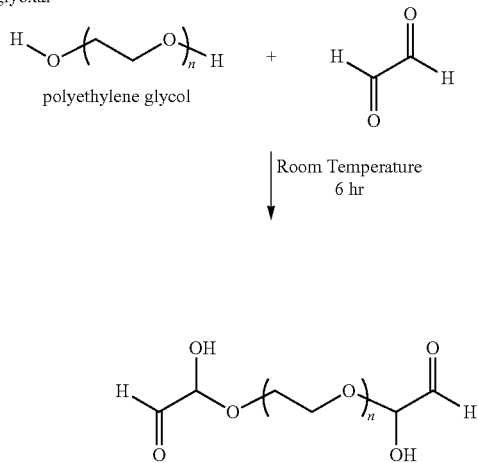

Scheme 2: A representative chemical structure of the polyethylene glycol based cross-linking agent produced from reacting polyethylene glycol diglycidyl ether with glyoxal

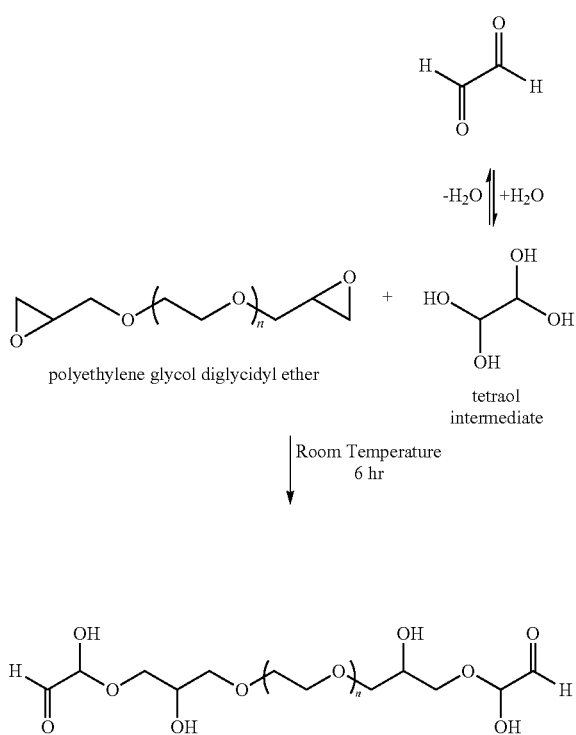

A shown in scheme 2, glyoxal in water present in the form of tetraol intermediate (Whipple E. B., Structure of glyoxal in water, J. Am. Chem. Soc., 1970, 92 (24), pp 7183-7186, DOI: 10.1021/ja00727a027). Without being limited to a specific theory, the tetraol intermediate undergoes a nucleophilic addition reaction with the epoxy groups of the polyethylene glycol diglycidyl ether to form the target polyethylene glycol based polymer with the aldehyde end groups.

The polyalkylene glycol based cross-linking agent may be prepared by any suitable and convenient procedure. The dialdehyde and the polyalkylene glycol compound are generally reacted in a mole ratio of dialdehyde to polyalkylene glycol compound of about 10.0:0.1 to about 2.0:1.0. Preferably the reaction is carried out in water as a solvent at a weight ratio of reactant to solvent from 1:0.1 to 1:20, preferably from 1:0.5 to 1:10.

The reaction may be carried out within the temperature range of room temperature up to 100° C. Preferably, the reaction is carried out at room temperature for about 4 hours, more preferably for about 12 hours and most preferably for about 24 hours. The product of the reaction is water-soluble, and can be diluted with water to any desirable concentration.

Another aspect of the present invention is an odor absorbing material that may present during the preparation of the polyalkylene glycol based crosslinking agent. The odor absorbing material also may be added to polyalkylene glycol based crosslinking agent after dilution with water, before applying the solution to the pulp.

Preferably the odor absorbing material is a material has a functional group able to bridge with cellulose fiber via the polyethylene glycol based cross-linking agent. Preferably, the odor absorbing material is cyclodextrin. The term "cyclodextrin" may include any of the known cyclodextrins such as unsubstituted cyclodextrins containing from six to twelve glucose units. Examples of cyclodextrin include α-cyclodextrin, β-cyclodextrin, γ-cyclodextrin and/or their derivatives or mixtures thereof. As shown in Scheme 3, cyclodextrin tends to bridge with cellulose chain by reacting with the crosslinking agent of the present invention. So, cyclodextrin is covalently bonded to the transfer fiber of the present invention.

Preferably, cyclodextrin is presents in amount ranges from 0.1% to 10.0%, by weight of the polyalkylene glycol reagent.

Optionally, a catalyst may be added to the solution to accelerate the reaction between the dialdehyde and the polyalkylene glycol based compound. Any catalyst known in the art to accelerate the formation of an acetal or hemiacetal linkage between the two materials could be used in embodiments of the present invention. Preferably, the catalyst is a Lewis acid selected from aluminum sulfate, magnesium sulfate, and any Lewis acid that contains at least a metal and a halogen, including, for example $FeCl_3$, $AlCl_3$, $TiCl_4$ and $BF_3$.

Scheme 3: a schematic diagram shows the chemical structure of transfer fiber covalently bonded to β-cyclodextrin.

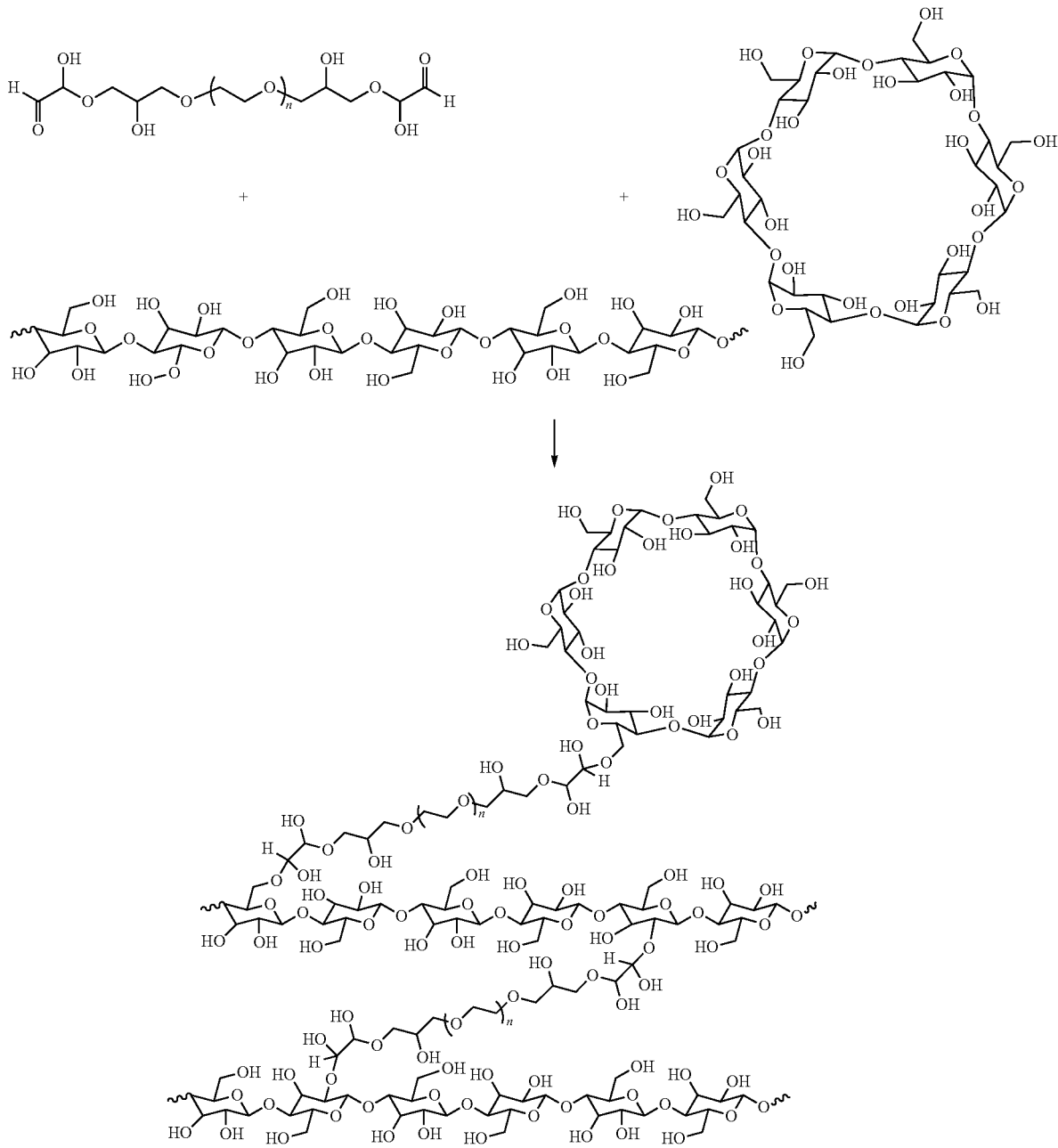

Another aspect of the present invention provides a method for making the liquid transfer pulp using the polyalkylene glycol based cross-linking agent described above. The process preferably comprises treating cellulose fibers in sheet, roll, fluff or slurry form with an aqueous solution of the polyalkylene glycol based cross-linking agent, followed by drying at sufficient temperature and for a sufficient period to remove water and accelerate the covalent bond between hydroxyl groups of cellulose fibers and the reagent. Using the guidelines provided herein, those skilled in the art can determine suitable drying and curing temperatures and times.

Cellulosic fibers suitable for use in the present invention include those primarily derived from wood pulp. Suitable wood pulp can be obtained from any of the conventional chemical processes, such as the kraft and sulfite processes. Preferred fibers are those obtained from various softwood pulps such as southern pine, white pine, Caribbean pine, western hemlock, various spruces, (e.g. sitka spruce), Douglas fir or mixtures and combinations thereof. Fibers obtained from hardwood pulp sources, such as gum, maple, oak, eucalyptus, poplar, beech, and aspen, or mixtures and combinations thereof also can be used in the present invention. Other cellulosic fibers derived from cotton linters, bagasse, kemp, flax, and grass also may be used in the present invention. The fibers can be comprised of a mixture of two or more of the foregoing cellulose pulp products. Particularly preferred fibers for use in the making transfer layer of the present invention are those derived from wood pulp prepared by the kraft and sulfite pulping processes.

The cellulosic fibers can be produced in a variety of forms. For example, one aspect of the present invention contemplates using cellulosic fibers in sheet, roll, or slurry form. In another aspect of the invention, the fibers can be in a mat of non-woven material. Fibers in mat form typically have a lower basis weight than fibers in the sheet form. In yet another feature of an embodiment of the invention, the fibers can be used in never dried or dry state.

In another embodiment of the invention, fibers in sheet or slurry form suitable for use in the present invention include caustic-treated partially mercerized fibers. Commercially available caustic treated pulp suitable for use in embodiments of the present invention include, for example, Porosanier-J-HP, available from Rayonier Advanced Materials (Jesup, Ga.).

In one embodiment, the polyalkylene glycol based cross-linking reagent is applied to the cellulose fibers in an aqueous solution. Preferably, the aqueous solution has a pH from about 2.5.0 to about neutral.

Preferably the polyalkylene glycol based cross-linking reagent, after being prepared is diluted with water to a concentration sufficient to provide from about 0.5 to 10.0 wt. % of reagent on pulp, more preferably from about 1.5 to 8 wt. %, and most preferably from about 2 to 5 wt. %. By way of example, 5 wt. % of polyalkylene glycol based cross-linking based cross-linking reagent means 5.0 g of the polyalkylene glycol based cross-linking reagent per 100 g oven dried pulp.

Any method of applying a solution of polyalkylene glycol based cross-linking agent to the pulp may be used. The method preferably leads to an impregnation of the cellulose fiber with the solution of the polyalkylene glycol based cross-linking reagent, whereby the polyalkylene glycol based cross-linking reagent may be adhered to the fibers, adsorbed on the surface of the fibers, or linked via chemical, hydrogen or other bonding (e.g., Van der Waals forces) to the fibers. Acceptable methods include, for example, suspending, spraying, dipping, impregnation, and the like.

Preferably, fiber in fluff form is suspended in an aqueous solution of polyalkylene glycol based cross-linking reagent, then sheeted. Fiber in sheet form is preferably impregnated with a solution of the polyalkylene glycol based cross-linking reagent and pressed for uniform distribution of the reagent. Fibers in the roll form are conveyed through a treatment zone where the crosslinking agent solution is applied on both surfaces by conventional methods such as spraying, rolling, dipping, knife-coating or any other manner of impregnation. A preferred method is adding an aqueous solution containing the polyalkylene oxide based cross-linking reagent to a fully bleached never dried pulp in sheet form then pressing to a desired solution pick-up.

Fibers in slurry, fluff, roll, or sheet form after treatment with the polyalkylene oxide based cross-linking reagent are preferably dried in a one step process. Such drying removes water from the fibers, thereupon inducing the formation of acetal σ-bonds between hydroxyl groups of the cellulosic chains and the polyalkylene glycol based cross-linking agent. Any drying temperature and time can be used so long as they produce the desired effects described herein.

Drying typically is carried out in a dryer having a temperature from about 50° C. to about 150° C., and more preferably from about 60° C. to about 140° C., and most preferably from about 70° C. to about 130° C. Drying is preferably carried out for a sufficient period to permit complete fiber drying and efficient bonding between cellulosic fibers and the polyalkylene glycol based cross-linking reagent. Preferably, the fibers are dried from about 1 min to about 30 min.

To obtain a short drying time, it is necessary that, the water in the wet pulp is removed substantially. Water removal is conventionally achieved by mechanical means such pressing.

The cellulosic based transfer fibers made in accordance with embodiments of the present invention preferably possess characteristics that are desirable as a transfer layer in absorbent articles. Like for instance, the transfer fiber of the present invention is polydisperse regarding fiber length in addition to the distorted morphology, so when air-laid produces layer with high void volume.

The transfer fibers also preferably possess characteristics making it suitable for use as a transfer layer in absorbent articles, like having a liquid retention after centrifuge (RAC) not higher than 0.65 grams of synthetic urine per gram of fiber at a centrifuge speed of 1300 rpm (hereinafter "gig"). The retention after centrifuge measures the ability of the fibers to retain fluid against a centrifugal force.

The transfer fibers preferably have a free swell (FS) greater than about 9.0 gig, and absorbency under load of 0.3 psi of greater than about 8.0 gig.

The free swell measures the ability of the fibers to absorb fluid without being subjected to a confining or restraining pressure. The absorbency under load measures the ability of the fibers to absorb fluid against a restraining or confining force of 0.3 psi. The liquid retention under centrifuge, free swell, and absorbency under load preferably are determined by the hanging cell test method described in the example section.

There are other advantages for the transfer fibers of the present invention. Preferably transfer fibers made in accordance with the present invention contains less than 25.0% knots and fines and have ISO brightness of over 80%.

The properties of the transfer fibers prepared in accordance with the present invention make the fibers suitable for use, for example, as a bulking material, in the manufacturing of high bulk specialty fibers that require good absorbency and porosity. The transfer fibers can be used, for example, in absorbent products. The fibers may also be used alone, or preferably incorporated into other cellulosic fibers to form blends using conventional techniques, such as air laying techniques. In an airlaid process, the transfer fibers of the present invention alone or in combination with other fibers are blown onto a forming screen or drawn onto the screen via a vacuum. Wet laid processes may also be used, combining the cellulosic based transfer fibers of the invention with other cellulosic fibers to form sheets or webs of blends.

The cellulosic based transfer fibers of the present invention may be incorporated into various absorbent articles, preferably intended for body waste management such as adult incontinent pads, feminine care products, and infant diapers. The cellulosic based transfer fibers can be used as a transfer layer in the absorbent articles, wherein it placed as a separate layer on top of the absorbent core, and it can be utilized in the absorbent core of the absorbent articles in a blend with SAP or without. Towels and wipes also may be made with the cellulosic fibers of the present invention, and other absorbent products such as filters.

The transfer fibers of the present invention were incorporated into an absorbent article as a transfer layer, and evaluated by the several tests shown in the examples section such as a Specific Absorption Rate Test (SART). The tests results show that the absorbent article that contained the transfer fibers of the present invention provided results comparable to those obtained by using commercial cross-linked fibers, especially those cross-linked with polycarboxylic acids.

In order that various embodiments of the present invention may be more fully understood, the invention will be illustrated, but not limited, by the following examples. No specific details contained therein should be understood as a limitation to the present invention except insofar as may appear in the appended claims.

EXAMPLES

The following test methods were used to measure and determine various physical characteristics of the inventive cellulosic based transfer fibers.

Hanging Cell Test Method

The absorbency test method was used to determine the absorbency under load, free swell, and retention after centrifuge. The test was carried out in a one inch inside diameter plastic cylinder having a 100-mesh metal screen adhering to the cylinder bottom "cell," containing a plastic spacer disk having a 0.995-inch diameter and a weight of about 4.4 g. In this test, the weight of the cell containing the spacer disk was determined to the nearest 0.001 g, and then the spacer was removed from the cylinder and about 0.35 g (dry weight basis) of cellulosic based transfer fibers were air-laid into the cylinder. The spacer disk then was inserted back into the cylinder on the fibers, and the cylinder group was weighed to the nearest 0.001 g. The fibers in the cell were compressed with a load of 4.0 psi for 60 seconds, the load then was removed and fiber pad was allowed to equilibrate for 60 seconds. The pad thickness was measured, and the result was used to calculate the dry bulk of cellulosic based transfer fibers.

A load of 0.3 psi was then applied to the fiber pad by placing a 100 g weight on the top of the spacer disk, and the pad was allowed to equilibrate for 60 seconds, after which the pad thickness was measured, and the result was used to calculate the dry bulk under load of the cellulosic based transfer fibers. The cell and its contents then were hanged in a Petri dish containing a sufficient amount of saline solution (0.9% by weight saline) to touch the bottom of the cell. The cell was allowed to stand in the Petri dish for 10 minutes, and then it was removed and hanged in another empty Petri dish and allowed to drip for about 30 seconds. The 100 g weight then was removed and the weight of the cell and contents was determined. The weight of the saline solution absorbed per gram fibers then was determined and expressed as the absorbency under load (g/g). The free swell of the cellulosic based transfer fibers was determined in the same manner as the test used to determine absorbency under load above, except that this experiment was carried using a load of 0.01 psi. The results are used to determine the weight of the saline solution absorbed per gram fiber and expressed as the absorbent capacity (g/g).

The cell then was centrifuged for 3 min at 1400 rpm (Centrifuge Model HN, International Equipment Co., Needham HTS, USA), and weighed. The results obtained were used to calculate the weight of saline solution retained per gram fiber, and expressed as the retention after centrifuge (g/g).

Fiber Quality

Fiber quality evaluations (fiber length, kink, curl, and fines content) were carried out on an OpTest Fiber Quality Analyzer (OpTest Equipment Inc., Waterloo, Ontario, Canada) and Fluff Fiberization Measuring Instruments (Model 9010, Johnson Manufacturing, Inc., Appleton, Wis., USA).

Fluff Fiberization Measuring Instrument is used to measure knots, nits and fines contents of fibers. In this instrument, a sample of transfer fibers in slurry form was continuously dispersed in an air stream. During dispersion, loose fibers passed through a 16 mesh screen (1.18 mm) and then through a 42 mesh (0.36 mm) screen. Pulp bundles (knots) which remained in the dispersion chamber and those that were trapped on the 42-mesh screen were removed and weighed. The formers are called "knots" and the latter "accepts." The combined weight of these two was subtracted from the original weight to determine the weight of fibers that passed through the 0.36 mm screen. These fibers were referred to as "fines."

Examples 1 to 4 illustrates a representative method for making a solution of polyethylene glycol based crosslinking reagent of an embodiment of the present invention and use it in making transfer fibers in sheet and fluff form using the impregnation technique.

Example 1

To a solution of glyoxal in water (50.0 g of 40% solution, 0.34 mol) was added polyethylene glycol diglycidyl ether (10.0 g, MW=500 g/mol, 0.02 mol). The produced solution was stirred at room temperature until a clear viscous solution of polyethylene glycol based glyoxal was obtained (12 hr). Water was then added to adjust the total weight of the solution to 1.0 kg (final concentration of polyethylene glycol based glyoxal reagent is 3.0% by weight).

The produced solution was added to a plastic tray, a sheet of Rayfloc-J-LDE (12×12 inch$^2$, basis weight 680 gsm) was dipped into the solution then pressed to achieve the desired level of polyethylene glycol based glyoxal reagent on pulp (about 3.0 wt. %). Several sheets were prepared in the same manner and dried in an oven as shown in Table I. Prepared sheets of transfer fibers were defiberized by feeding them through a hammermill and produced fluff was evaluated by hanging cell test and fiber quality test. Test results are summarized in Tables I and II.

TABLE I

| | | | Hanging cell test results (g/g) | | |
|---|---|---|---|---|---|
| Sample No. | Drying Temperature ° C. | Brightness | Free Swell | Absorbency under load | Retention after centrifuge |
| 1 | 110 | 87.6 | 9.97 | 8.6 | 0.51 |
| 2 | 120 | 87.3 | 9.70 | 8.1 | 0.45 |
| 3 | 130 | 87.4 | 11.5 | 9.5 | 0.45 |
| Rayfloc-J-LDE | | 81.3 | 10.1 | 8.2 | 0.76 |

TABLE II

| Sample No | Kamas Energy (Watts/Kg) | Johnson Classification (%) | | |
|---|---|---|---|---|
| | | Accepts | Knots | Fines |
| 1 | 28.5 | 85.8 | 10.1 | 4.3 |
| 2 | 37.2 | 83.2 | 11.8 | 5.4 |
| 3 | 39.8 | 82.2 | 13.6 | 4.7 |

Example 2

To a solution of glyoxal in water (50.0 g of 40% solution, 0.34 mol) was added polyethylene glycol diglycidyl ether (10.0 g, MW=500 g/mol, 0.02 mol). The produced solution was stirred at room temperature until a clear viscous solution of polyethylene glycol based glyoxal was obtained (12 hr). Water was then added to adjust the total weight of the solution to 1.0 kg (final concentration of polyethylene glycol based glyoxal is 3.0%).

The produced solution was added to a plastic container, a sample of Rayfloc-J-LDE (never dried pulp) was suspended in the solution at 4% consistency, mixed for 5 min, sheeted (12×12 inch$^2$, basis weight 680 gsm) and pressed to a 100% liquid pick up (3% of polyethylene glycol based glyoxal on pulp). Several samples were prepared in the same manner, dried and cured in a one step process at various temperatures for fixed period as shown in Table III. Prepared sheets of transfer fibers were defiberized by feeding them through a hammermill and evaluated by hanging cell test and fiber quality test. Test results are summarized in Tables III and IV.

TABLE III

| | | Hanging Cell test results (g/g) | | |
|---|---|---|---|---|
| Sample No. | drying temperature (° C.) | Free swell (FS) | Absorbency under load (AUL) | Retention after centrifuge (RAC) |
| 4 | 120 | 10.2 | 9.0 | 0.53 |
| 5 | 140 | 10.8 | 9.7 | 0.48 |
| 6 | 160 | 11.60 | 9.0 | 0.45 |

TABLE IV

| Fiber Quality | Rayfloc-J-LDE | Sample 6 | Sample 1 |
|---|---|---|---|
| Fiber length (mm) | 1.011 | 1.234 | 1.332 |
| Fine (%) | 55.81 | 29.32 | 32.17 |
| Kink angel | 36.81 | 95.72 | 66.02 |
| [Coarseness], mg/m | 0.210 | 0.339 | 0.422 |
| Kink index | 1.3 | 2.8 | 1.8 |

Example 3

To a 40% solution of glyoxal in water (50.0 g of 40% solution, 0.34 mol) was added polypropylene glycol-400 (10.0 g, 0.025 mol). The produced solution was stirred at room temperature until a clear viscous solution was obtained (4 hr). Water was added to adjust the total weight of the solution to 1.0 kg (final concentration of dual function reagent is 3.0%). The produced solution was added to a plastic tray, a sheet of Rayfloc-J-LDE (12×12 inch$^2$, basis weight 680 gsm) was dipped in the solution then pressed to achieve the desired level of reagent on pulp (about 3.0 wt. %). Several sheets were prepared in the same manner and dried in an oven at 70° C. then cured at temperature shown in Table V. Prepared sheets of transfer fibers were defiberized by feeding them through a hammermill and evaluated by hanging cell test and fiber quality test. Test results are summarized in Table V.

TABLE V

| | | Hanging cell test results (g/g) | | |
|---|---|---|---|---|
| Sample No. | Drying Temperature ° C. (Time min) | Free Swell | Absorbency under load | Retention after centrifuge |
| 7 | 120 (10) | 8.81 | 10.18 | 0.53 |
| 8 | 120 (20 min) | 9.45 | 10.72 | 0.53 |
| 9 | 130 (15 min) | 9.06 | 10.49 | 0.51 |
| Rayfloc-J-LDE | | 10.1 | 8.2 | 0.76 |

Example 4

To a 40% solution of glyoxal in water (50.0 g of 40% solution, 0.34 mol) was added polyethylene glycol-400 (20.0 g, 0.05 mol). The produced solution was stirred at room temperature until a clear viscous solution was obtained (4 hr). Water was added to adjust the total weight of the solution to 1.0 kg (final concentration of dual function reagent is 3.0%). The produced solution was added to a plastic tray, a sheet of Rayfloc-J-LDE (12×12 inch$^2$, basis weight 680 gsm) was dipped in the solution then pressed to achieve the desired level of reagent on pulp (about 3.0 wt. %). Several sheets were prepared in the same manner and dried in an oven at 70° C. then cured at temperature shown in Table VI. Prepared sheets of transfer fibers were defiberized by feeding them through a hammermill and evaluated by hanging cell test and fiber quality test. Test results are summarized in Table VI.

TABLE VI

| | | Hanging cell test results (g/g) | | |
|---|---|---|---|---|
| Sample No. | Drying Temperature ° C. (Time min) | Free Swell | Absorbency under load | Retention after centrifuge |
| 10 | 120 (10) | 8.45 | 9.79 | 0.53 |
| 11 | 120 (20 min) | 9.14 | 10.40 | 0.56 |
| 12 | 130 (15 min) | 8.58 | 9.80 | 0.54 |
| Rayfloc-J-LDE | | 10.1 | 8.2 | 0.76 |

Example 5

To a 40% solution of glyoxal in water (50.0 g of 40% solution, 0.34 mol) was added polypropylene glycol-400 (10.0 g, 0.025 mol). The produced solution was stirred at room temperature until a clear viscous solution was obtained (4 hr). Water was added to adjust the total weight of the solution to 1.0 kg (final concentration of dual function reagent is 3.0%). Then 1.0 g of β-cyclodextrin was added. The mixture was stirred until a clear solution was obtained. The produced solution was added to a plastic tray, a sheet of Rayfloc-J-LDE (12×12 inch$^2$, basis weight 680 gsm) was dipped in the solution then pressed to achieve the desired level of reagent on pulp (about 3.0 wt. %). Several sheets were prepared in the same manner and dried in an oven at 70° C. then cured at temperature shown in Table VII. Prepared sheets of transfer fibers were defiberized by feeding them through a hammermill and evaluated by hanging cell test and fiber quality test. Test results are summarized in Table VII.

TABLE VII

| Sample No. | Drying Temperature ° C. (Time min) | Hanging cell test results (g/g) | | |
|---|---|---|---|---|
| | | Free Swell | Absorbency under load | Retention after centrifuge |
| 13 | 120 (20) | 8.8 | 10.4 | 0.51 |
| 14 | 130 (20 min) | 8.8 | 10.3 | 0.53 |
| 15 | 140 (15 min) | 8.7 | 11.3 | 0.50 |
| Rayfloc-J-LDE | | 10.1 | 8.2 | 0.76 |

Example 6

To a 40% solution of glyoxal in water (50.0 g of 40% solution, 0.34 mol) was added polypropylene glycol-400 (10.0 g, 0.025 mol). The mixture was stirred until a clear solution was obtained (about 10 min), then 1.0 g of β-cyclodextrin was added. The produced solution was stirred at room temperature until a clear viscous solution was obtained (4 hr). Water was added to adjust the total weight of the solution to 1.0 kg (final concentration of dual function reagent is 3.0%). The mixture was stirred until a clear solution was obtained.

The produced solution was added to a plastic tray, a sheet of Rayfloc-J-LDE (12×12 inch$^2$, basis weight 680 gsm) was dipped in the solution then pressed to achieve the desired level of reagent on pulp (about 3.0 wt. %). Several sheets were prepared in the same manner and dried in an oven at temperatures shown in Table VIII. Prepared sheets of transfer fibers were defiberized by feeding them through a hammermill and evaluated by hanging cell test and fiber quality test. Test results are summarized in Table VIII.

TABLE VIII

| Sample No. | Drying Temperature ° C. (Time min) | Hanging cell test results (g/g) | | |
|---|---|---|---|---|
| | | Free Swell | Absorbency under load | Retention after centrifuge |
| 16 | 120 (20) | 9.1 | 10.5 | 0.53 |
| 17 | 130 (20 min) | 8.5 | 10.2 | 0.50 |
| 18 | 140 (15 min) | 8.8 | 10.9 | 0.51 |
| Rayfloc-J-LDE | | 10.1 | 8.2 | 0.76 |

SEM Analysis

Figure 1B:
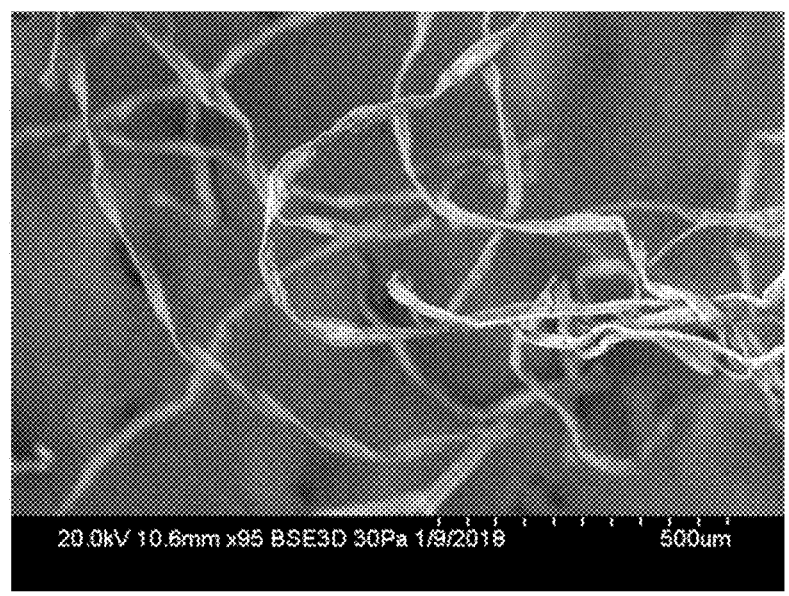

An SEM images of transfers fiber prepared as shown in examples 3 and 6 (samples 9 and 17) of the present invention are shown in FIG. 1(A) and FIG. 1(B). The image shows a ribbon like fibers with twists and curls. These morphology characteristics are desirable in transfer fibers, since fiber with these characteristics upon air-laying produces a structure with high bulk, high void volume and high porosity. These characteristics also add spring back property to the structure, so the air-laid structure will not collapse when weight is applied onto it.

Example 7

Fiber Specific Absorption Rate Test (SART)

The cellulosic based transfer fibers made in accordance with an embodiment of the present invention was tested for liquid acquisition properties. To evaluate the acquisition properties, the acquisition time, the time required for a dose of saline to be absorbed completely into the absorbent article was determined.

The Acquisition Time was determined by the SART test method. The test was conducted on an absorbent core obtained from a commercially available diaper stage 4 Pampers®. A sample core was cut from the center of the diaper, had a circular shape with a diameter of about 60.0 mm, and ad an average weight of about 2.0 g (±0.2 g).

In this test, the acquisition layer of the sample core was replaced with an air-laid pad made from the cellulosic based transfer fibers of an embodiment of the present invention. The fiber pad weighed about 0.7 g and was compacted to a thickness of about 3.0 to about 3.4 mm before it was used.

Figure 2:
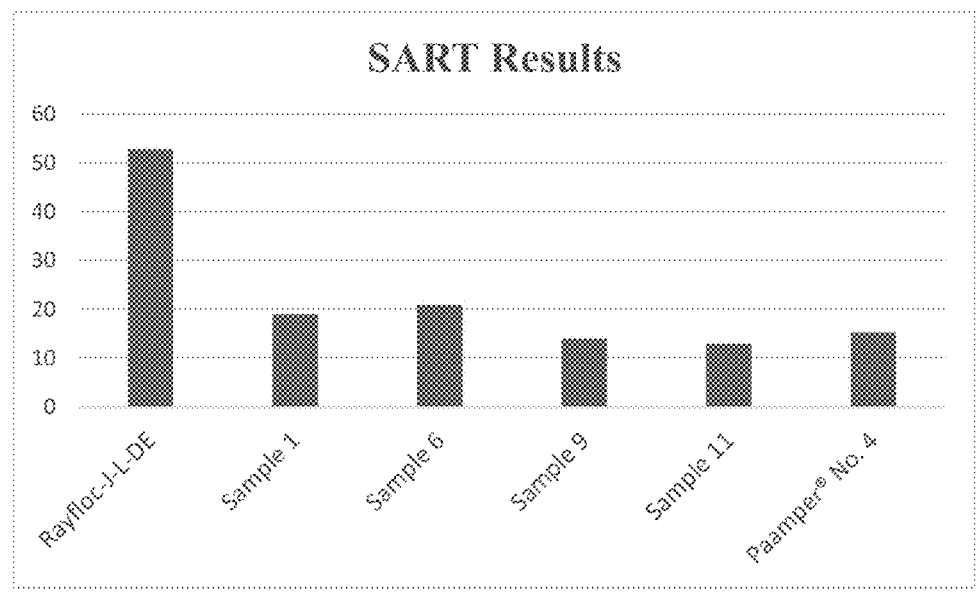
FIG. 2 is the time of the third insults of the SART test described in Example 7.

The core sample including the acquisition layer was placed into the testing apparatus. The apparatus with a load of 0.7 psi and its contents were placed on a leveled surface and dosed with three successive insults, each being 9.0 ml of saline solution, (0.9% by weight), the time interval between doses being 10 min. The time in seconds required for the saline solution of each dose to disappear from the funnel cup was recorded and expressed as an acquisition time, or strikethrough. The third insult strikethrough time is provided in FIG. 2. The data in FIG. 2 includes the results obtained from testing acquisition layers of commercial cross-linked fibers and conventional uncross-linked fibers. It can be seen from FIG. 2 that, the acquisition times of the modified fibers of embodiments of the present invention are as good as or better than the acquisition time for the commercial cross-linked fibers made by dry crosslinking process using polycarboxylic acid.

The invention claimed is:

1. A polyalkylene glycol based reagent with aldehyde end groups,
    which is a reaction product of a polyalkylene glycol compound and aldehyde compounds,
    wherein the polyalkylene glycol compound has the molecular formula R'O—(R—O)$_n$R' where n is 6 to 2000, R is ethyl, isopropyl or butyl and R' is H or a glycidyl group,
    wherein each R' and its adjacent O of the polyalkylene glycol compound form two R'O end groups,
    wherein the two R'O end groups of the polyalkylene glycol compound react with the aldehyde compounds to form two aldehyde compound end groups on the polyalkylene glycol compound,
    wherein the polyalkylene glycol based reagent has a backbone of the polyalkylene glycol compound, and the two aldehyde compound end groups are the same or different aldehyde compounds, and
    wherein the aldehyde compound end groups of the polyalkylene glycol based reagent are capable of reacting with cellulose fibers.

2. The polyalkylene glycol based reagent of claim 1, wherein the reagent is suitable for making liquid transfer fiber.

3. The polyalkylene glycol based reagent of claim 2, wherein the transfer fiber is useful for use as a surge layer in an absorbent article.

4. The polyalkylene glycol based reagent of claim 1, wherein the reagent is formed from reacting polyalkylene glycol compound and a dialdehyde compound.

5. The polyalkylene glycol based reagent of claim 4, wherein the polyalkylene glycol compound is water soluble or form water soluble products when reacted with the dialdehyde.

6. The polyalkylene glycol based reagent of claim 1, wherein the polyalkylene glycol compound is a polyethylene glycol, polypropylene glycol, polytetrahydrofuran, polyethylene glycol diglycidyl ether, polypropylene glycol diglycidyl ether or polytetrahydrofuran diglycidyl ether.

7. The polyalkylene glycol based reagent of claim 6, wherein the polyalkylene glycol diglycidyl ether is polyethylene glycol diglycidyl ether, polypropylene glycol diglycidyl ether, polyethylene glycol or polypropylene glycol.

8. The polyalkylene glycol based reagent of claim 4, wherein the dialdehyde is selected from aliphatic dialdehyde, urea based aldehyde and combinations thereof.

9. The polyalkylene glycol based reagent of claim 8, wherein the aliphatic dialdehyde is selected from glyoxal, glutaraldehyde, 1,4-cyclohexane dicarboxaldehyde, 1,3-cyclohexane dicarboxaldehyde, glyceraldehyde and the mixtures and combinations thereof.

10. The polyalkylene glycol based reagent of claim 8, wherein the urea based aldehyde is selected from the group consisting of methylolated ureas, methylolated cyclic urea methylolated lower alkyl cyclic urea, methylolated dihydroxy cyclic urea, dihydroxy cyclic urea, and lower alkyl substituted cyclic urea.

11. The polyalkylene glycol based reagent of claim 8, wherein the dialdehydes are selected from glyoxal, glutaraldehyde and 1,4-cyclohexane dicarboxaldehyde.

12. The polyalkylene glycol based reagent of claim 4, wherein the dialdehyde and the polyalkylene glycol diglycidyl ether are mixed in a 1:0.1 to about 2:1 equivalent.

13. The polyalkylene glycol based reagent of claim 4, wherein the reaction between the dialdehyde and the polyalkylene glycol is carried out in a solvent.

14. The polyalkylene glycol based reagent of claim 13, wherein the reaction solvent is water.

15. The polyalkylene glycol based reagent of claim 14, wherein the ratio of the solvent to reactants ranging from 10:1 to 1:10 by weight.

16. The polyalkylene glycol based reagent of claim 4, wherein the reaction between dialdehyde and polyalkylene glycol diglycidyl ether is carried at a temperature ranges from room temperature to 100° C. for at least 1 hours.

17. A method of making liquid transfer fiber, comprising: providing a solution of the polyalkylene glycol based crosslinking reagent of claim 1; providing cellulosic fiber; applying the solution of the polymeric based reagent to cellulosic fibers to impregnate the cellulosic based fibers; and drying the treated cellulosic fibers.

18. The method of claim 17, wherein the solution of the polymeric based reagent has a pH of about 1.5 to neutral.

19. The polyalkylene glycol based reagent of claim 1, wherein the reagent includes an odor absorbing material in an amount range from 0.1 to 10 weight percent of the polyalkylene glycol based cross-linking reagent.

20. The polyalkylene glycol based reagent of claim 19, wherein the odor absorbing material is chemically bonded to the polyalkylene glycol based cross-linking reagent.

21. The polyalkylene glycol based reagent of claim 20, wherein the odor absorbing material is α-cyclodextrin, β-cyclodextrin, γ-cyclodextrin and/or their derivatives or mixtures thereof.

22. The method of claim 17, wherein applying the solution of the polymeric based reagent to the cellulosic based fiber include any method produced impregnated cellulose fiber such as: suspending, spraying, dipping or applying with a puddle press, size press or a blade-coater.

23. The method of claim 17, wherein the cellulosic fiber is provided in sheet, nonwoven mat form or slurry form.

24. The method of claim 17, wherein the solution of the reagent is applied to the cellulosic fibers to provide 1 wt % to about 6 wt % of polymeric based crosslinking reagent on fiber.

25. The method of claim 17, wherein the cellulosic based fiber is provided in a dry state or a never dried state.

26. The method of claim 17, wherein the cellulosic based fiber is a conventional cellulose fiber selected from the group consisting of: hardwood cellulose pulp, softwood cellulose pulp obtained from a kraft or sulfite chemical process, caustic-treated pulp and combinations and mixtures thereof.

27. The polyalkylene glycol based reagent according to claim 1, wherein the aldehyde compound is a urea based aldehyde which is selected from the group consisting of dimethyldihydroxy urea (DMDHU, or 1,3-dimethyl-4,5-dihydroxy-2imidazolidinone), dimethyloldihydroxyethylene urea (DMDHEU, or 1,3-dihydroxymethyl-4,5-dihydroxy-2-imidazolidinone), dimethylol urea (DMU, or bis[N-hydroxymethyl]urea), dihydroxyethylene urea (DHEU, or 4,5-dihydroxy-2-imidazolidinone), dimethylolethylene urea (DMEU, or 1,3-dihydroxymethyl-2-imidazolidinone), and dimethyldihydroxyethylene urea (DDI, or 4,5dihydroxy-1,3-dimethyl-2-imidazolidinone), or a glyoxal adduct of urea.

28. Transfer fibers comprising cellulosic fibers which are crosslinked with the polyalkylene glycol based reagent according to claim 1.

29. An absorbent article comprising the transfer fiber of claim 28.

30. A method of making the polyalkylene glycol compound according to claim 1, comprising the steps of:
  a. provide a polyalkylene glycol compound;
  b. provide aldehyde compounds;
  c. mix the polyalkylene glycol compound and the aldehyde compounds;
  d. stir the mixture under conditions to react the aldehyde and polyalkylene glycol compounds until a clear solution is obtained,
  e. dilute the reaction mixture with water to a desirable concentration, and
  f. adjust the diluted aqueous solution to a pH value of about 4.5 to about neutral, to obtain the polyalkylene glycol based reagent.

* * * * *